Jan. 15, 1924.  
J. H. DE IONGH  
1,481,052
CONNECTION BETWEEN PISTONS AND THEIR CONNECTING RODS
Filed Aug. 20, 1923
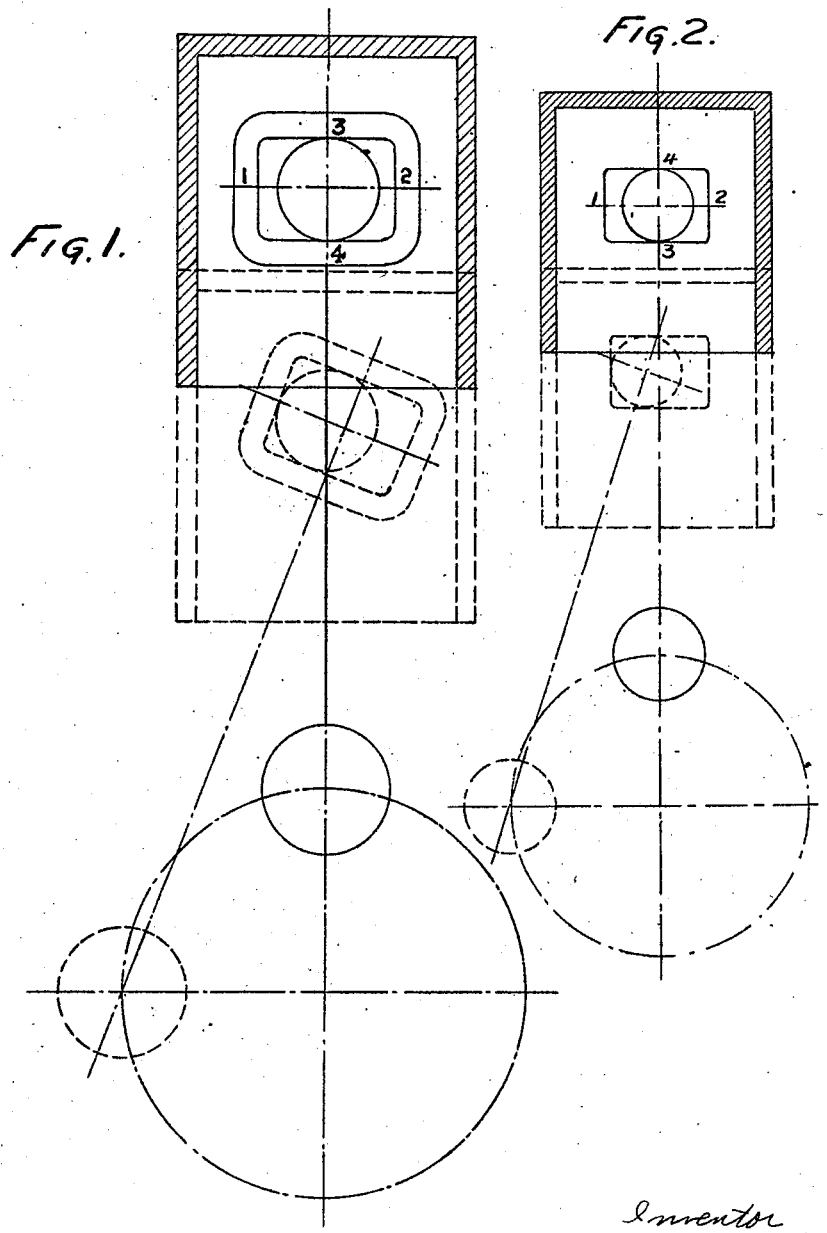

Patented Jan. 15, 1924.

1,481,052

UNITED STATES PATENT OFFICE.

JOHAN HENDRIK DE IONGH, OF BERGEN, NETHERLANDS, ASSIGNOR OF ONE-HALF TO NAAMLOOZE VENNOOTSCHAP KROMHOUT MOTOREN FABRIEK D. GOEDKOOP, JR., OF AMSTERDAM, NETHERLANDS, A DUTCH LIMITED COMPANY.

CONNECTION BETWEEN PISTONS AND THEIR CONNECTING RODS.

Application filed August 20, 1923. Serial No. 658,367.

*To all whom it may concern:*

Be it known that I, JOHAN HENDRIK DE IONGH, citizen of the Kingdom of the Netherlands and of Dutch nationality, residing in Bergen, Netherlands, 't Landhuis, have invented certain new and useful Improvements in and Connecting with a Connection Between Pistons and Their Connecting Rods (for which I have filed applications in the Netherlands, filed October 6th, 1921, No. 20,523; in Great Britain, filed June 15th, 1923, No. 15,607/23; in Norway, filed June 19th, 1923, No. 28,794; and in Sweden, filed June 19th, 1923, No. 1,822/23), of which the following is a full, clear, and exact specification.

The object of this invention is to provide a connection between pistons and their connecting rods, which will reduce the friction between them.

Devices of this kind as hitherto made comprise a link mechanism which always causes considerable friction, the pressure of the piston forcing the connecting pin of the piston against the bearing surface of the connecting-rod so that, in consequence of the resulting frictional resistance, the end of the connecting-rod is subjected to sideway pressure, which, in the ordinary construction is received by a connecting rod bush.

According to the present invention an opening in the end of the connecting-rod, or the openings in the opposite walls of the piston, for the reception of the connecting pin, is, or are, frame-shaped or slotted; the connecting pin, or pins, in the one case being carried by the piston, and, in the other case, by the end of the connecting rod and the co-operating surfaces of the connecting-pin, or pins and of the frame, having curvatures of different radii, the component of the force exerted by the connecting-rod on the contact-surfaces of the pin, or pins, and frame-shaped or slotted, opening in the direction of the working surface being smaller, in all positions of the connecting rod, then the frictional resistance between the co-operating surfaces, in such a manner that these surfaces roll over each other.

The accompanying drawings represent, diagrammatically, sectional elevations of two devices illustrative of how this invention can be performed.

In Figure 1 the working surface 4, of the frame-shaped, or slotted, end of the connecting pin, is presumed to be a plane. The movements of the end of the connecting rod are limited by the surface 1 and 2. The pressure of the piston is exerted in the direction of the connecting rod and therefore acts on the surface 4 which may also be curved, its radius of curvature being determined by the co-efficient of friction between both the bearing surfaces.

In order to provide for proper change of direction of the pressure exerted by the piston, the connecting-pin is situated with but little play between the surface 3, and the opposite surface 4, so that the connecting pin can roll between the said surfaces.

The invention is intended more especially for application to single-acting, or two-stroke, engines, where the force exerted on the piston is always in the same direction.

The invention may be carried out in practice in other ways; for instance, the connecting-pin may be carried by, or be formed on, the end of the connecting rod and roll to and fro in the frame-shaped, or slotted, openings in the piston, as illustrated in Figure 2.

I claim:

In an engine the combination of a piston, a connecting rod and a pin pivotally connecting the connecting rod to the piston, one of the first mentioned two elements having means to permit movement of the pivotal pin and therefore of the inner end of the connecting rod transversely of the piston and at an angle to the axis of the piston.

In testimony whereof, I have signed my name to this specification.

JOHAN HENDRIK DE IONGH.